United States Patent [19]

Iohara et al.

[11] 4,454,196

[45] Jun. 12, 1984

[54] POLYESTER MULTIFILAMENT YARN AND A PROCESS FOR MANUFACTURING THE SAME

[75] Inventors: Kohichi Iohara; Michikage Matsui, both of Ibaraki, Japan

[73] Assignee: Teijin Limited, Osaka, Japan

[21] Appl. No.: 424,254

[22] Filed: Sep. 27, 1982

Related U.S. Application Data

[62] Division of Ser. No. 302,952, Sep. 16, 1981, Pat. No. 4,410,743.

[30] Foreign Application Priority Data

Sep. 25, 1980 [JP] Japan ................................ 55-132254

[51] Int. Cl.$^3$ .............................................. D02G 3/00
[52] U.S. Cl. ................................... 428/359; 428/364; 428/373; 428/399; 57/243; 57/252; 57/205; 57/207
[58] Field of Search ............... 428/364, 399, 373, 359; 57/243, 252, 205, 207

[56] References Cited

U.S. PATENT DOCUMENTS

| | | | |
|---|---|---|---|
| 3,655,839 | 4/1972 | Sempel et al. | 428/364 |
| 4,016,329 | 4/1977 | Matsuyama et al. | 428/364 |
| 4,157,419 | 6/1979 | Mirhej | 428/364 |

*Primary Examiner*—George F. Lesmes
*Assistant Examiner*—E. Rollins Buffalow
*Attorney, Agent, or Firm*—Burgess, Ryan & Wayne

[57] ABSTRACT

A polyester multifilament consisting essentially of a filament groups (I) and (II). The filament group (I) is composed of a polyester selected from the group consisting of polyethylene terephthalate, polytrimethylene terephthalate and polytetramethylene terephthalate, and/or a blend and/or copolymer comprising at least two members selected from the polyesters. The filament group (II) is composed of a substrate composed of a polyester selected from the group consisting of polyethylene terephthalate, polytrimethylene terephthalate and polytetramethylene terephthalate, and/or a blend and/or a copolymer comprising at least two members selected from the polyesters and at least one polymer selected from the group consisting of styrene type polymers, methacrylate type polymers and acrylate type polymers, which is added to said substrate in an amount of 0.4 to 8% by weight based on the substrate.

5 Claims, No Drawings

POLYESTER MULTIFILAMENT YARN AND A PROCESS FOR MANUFACTURING THE SAME

This is a division of application Ser. No. 302,952, filed Sept. 16, 1981 U.S. Pat. No. 4,410,743.

BRIEF DESCRIPTION OF THE INVENTION

The present invention relates to a polyester multifilament yarn. More particularly, the present invention relates to a polyester multifilament yarn comprising a plurality of filaments groups which have such a structural difference that a remarkable difference in the lengths of constituent filaments of the filaments groups is generated when the multifilament yarn is subjected to a woolly treatment or a drawing operation.

BACKGROUND OF THE INVENTION

In natural fibers to be used for clothes, such as wool and silk, variations of the structure and physical properties among individual constituent fibers are larger than those in synthetic fibers. Such a great variation is an advantage rather than a disadvantage taking the demand of clothes into consideration. Namely, woven and knitted fabrics of natural fibers have a higher bulkiness, a softer touch and a higher stiffness than those of synthetic fibers because of such variations. Accordingly, in the field of synthetic fibers, experiments have been intentionally done to manufacture mixed multifilament yarns by forming variations, such as differences in the denier and length among constituent filaments.

Conventionally in order to obtain such mixed multifilament yarn, there is ordinarily adopted a method in which at least two kinds of multifilament yarns differing in the physical properties such as shrinkage, elongation and elasticity are independently spun and the multifilament yarns are appropriately opened and mixed at the drawing step, the false-twisting step or other similar steps. This method is advantageous in that the length difference among constituent filaments can easily be adjusted by selecting each kind of multifilament yarn. However, when it is intended to obtain a fine-denier yarn having a fineness of less than 150 denier, especially less than 75 denier, which is eagerly desired at present as a material for a high-quality silky or woolly product, which has described above, it is necessary to spin at least two kinds of multifilament yarns having a much finer denier and then mix them. Generally speaking, the productivity is decreased as the denier of constituent filaments and the total denier is decreased. In addition, spinning and mixing steps are more troublesome than a single spinning step. Therefore, the yarn-manufacturing cost is increased and the method is not commercially practical.

As means for producing differences of the structures, physical properties, fineness and shapes among constituent filaments without causing a substantial increase of the yarn-manufacturing cost, there has been examined a method, wherein filaments are blended while they are being spun. For carrying out this method, there are two methods i.e., a method using filaments of the same polymer, and a method comprising simultaneously spinning a plurality of polymers differing in their chemical structures, viscosities and the like.

In the former method wherein one polymer, is spun and blended, the extrusion amounts of the polymer are made different among extrusion holes of a spinneret, whereby there is obtained an assembly of filaments different in the deniers, sectional shapes and physical properties. In this method, however, since cooling of thick-denier filaments is delayed as compared with cooling of thin-denier filaments, there is obtained a multifilament yarn comprising a thick-denier component having low orientation and high elongation and a thin-component having high orientation and low elongation. If this multifilament yarn is subjected to a woolly treatment by utilizing a false twisting device, the thin-denier component is not easily elongated and is subjected to a high tension. As a result, fine-denier filaments gather in the central portion of the processed yarn. Contrary to this, since the thick-denier component is easily elongated, thick-denier filaments rise in the outer layer portion. A woven or knitted fabric formed from this yarn comes to have a hard touch and a weak stiffness. Namely, the knitted or woven fabric has a touch and feel quite different from those of a silky or woolly product for which a soft touch and a high stiffness are ordinarily required.

For the reasons set forth above, it is considered that the method of simultaneously spinning a plurality of polymers is the only one possible means left for attaining the above-mentioned mixed multifilament yarn. However, combinations of ordinary polymers which manifest substantial differences of physical properties under the same spinning conditions are in fact much more limited. Alternatively, use of special polymers involves a risk of deteriorating the feel and touch inherent in polyesters.

SUMMARY OF THE INVENTION

Under such background, the present inventors have done research with a view to developing a multifilament yarn having a soft touch and a good stiffness without manifestation of the foregoing defects involved in the conventional techniques, and have found that, if a small amount of a polymer obtained from a certain monomer having an unsaturated bond is blended in a polyester, the microstructure and physical properties of the polymers are surprisingly changed. Then, the present inventors have now completed the present invention based on this finding.

More specifically, in accordance with one fundamental aspect of the present invention, there is provided a polyester multifilament yarn consisting essentially of a filament groups (I) and (II). The filament group (I) is composed of a polyester selected from the group consisting of polyethylene terephthalate, polytrimethylene terephthalate and polytetramethylene terephthalate, and/or a blend and/or copolymer comprising at least two members selected from said polyesters. The filament group (II) is composed of a substrate composed of a polyester selected from the group consisting of polyethylene terephthalate, polytrimethylene terephthalate and polytetramethylene terephthalate, and/or a blend and/or a copolymer comprising at least two members selected from said polyesters and at least one polymer selected from the group consisting of styrene type polymers, methacrylate type polymers and acrylate type polymers, which is added to said substrate in an amount of 0.4 to 8% by weight based on the substrate.

In accordance with another fundamental aspect of the present invention, there is provided a process for manufacturing a polyester multifilament yarn, which comprises: melting independently a polyester (I) selected from the group consisting of polyethylene terephthalate, polytrimethylene terephthalate and polytetramethylene terephthalate or a polymer composition comprising at least two members selected from said polyesters and a polymer composition (II) comprising a substrate composed of a polyester selected from the group consisting of polyethylene terephthalate, polytrimethylene terephthalate and polytetramethylene terephthalate or at least two members selected from said polyesters and at least one polymer selected from the group consisting of styrene type polymers, methacrylate type polymers and acrylate type polymers, which is added to said substrate in an amount of 0.4 to 8% by weight based on said substrate; extruding said polymers (I) and (II) from different extrusion holes without mingling of the polymers (I) and (II); and after cooling, doubling the extrudates without twisting and taking up the resulting multifilament yarn.

DETAILED DESCRIPTION OF THE INVENTION

The filament group (I) of the present invention is composed of a polyester (I) selected from the group consisting of polyethylene terephthalate, polytrimethylene terephthalate and polytetramethylene terephthalate or a polymer composition (I) comprising at least two members selected from said polyesters. The polyester or polymer composition (I) may contain a delustering, dyeability-improving or antistatic additive in an amount of up to 10% by weight in the copolymerized or blended state.

The filament group (II) of the present invention is composed of a polymer composition (II) comprising a substrate composed of at least one polyester selected from polyethylene terephthalate, polytrimethylene terephthalate and polytetramethylene terephthalate and at least one polymer selected from the group consisting of styrene type polymers, methacrylate type polymers and acrylate type polymers, which is added to the substrate in an amount of 0.4 to 8% by weight based on the substrate. The polymer composition (II) may contain a delustering, dyeability-improving or antistatic additive in an amount of up to 10% by weight based on the whole composition (II).

It is important in the present invention that the average breaking elongation of the filament group (II) be larger than the average breaking elongation of the filament group (I). To our great surprise, it has been found that if a linear compound having bulky substituents on the side chains, such as a styrene type polymer, a methacrylate type polymer or an acrylate type polymer, is added to a polyester, orientation of the molecular chain of each constituent filament is drastically reduced, and accordingly, the elongation is remarkably increased. The reason has not completely been elucidated, but it is presumed that because of the peculiar chemical structure of the additive polymer, it may hardly be elongated in the polyester matrix and may be dispersed in the polyester matrix in the form of fine particles having a size smaller than 500 Å. Such fine particles are present among microfibrils of the substrate polyester while functioning as "rolls", whereby the above-mentioned phenomena of reduction of the orientation and increase of the elongation will probably occur.

As preferred examples of the additive polymer, there can be mentioned polymers of styrene and styrene derivatives such as α-methylstyrene, p-methoxystyrene, vinyltoluene, chlorostyrene and dichlorostyrene, polymers of methacrylate derivatives such as methyl methacrylate and ethyl methacrylate, and polymers of acrylate derivatives such as methyl acrylate and ethyl acrylate. From the viewpoint of the cost, polystryene and poly(methyl methacrylate) are especially preferred.

It is indispensable that the additive polymer should be contained in an amount of 0.4 to 8% by weight based on the substrate polyester in the filament group (II). When the content of the additive polymer is lower than 0.4% by weight, no substantial effect of reducing the orientation or increasing the elongation can be attained. On the other hand, if the additive polymer is added in an amount exceeding 8% by weight, the additive polymer causes a defect, and the strength characteristic of the filament group (II) is deteriorated, with the result that the ability to be spun and the stability of the process are considerably degraded. Therefore, incorporation of too large an amount of the additive polymer is not preferred.

In the present invention, it is preferred that the average denier of the constituent filaments in the filament group (I) be not smaller than the average denier of the constituent filaments in the filament group (II). In the present invention, since the filament group (I) has higher orientation and lower elongation than the filament group (II) for the above-explained reason. When a high tension is imposed during the drawing or processing step, filaments constituting the filament group (I) tend to gather in the core portion of the multifilament yarn. Accordingly, if the denier of constituent filaments in the filament group (I) is smaller than that of constituent filaments in the filament group (II), the stiffness is weakened in a woven or knitted fabric produced from the resulting multifilament yarn. On the contrary, if the denier of constituent filaments in the filament group (II) is smaller than that of constituent filaments in the filament group (I), thick-denier filaments form the central portion of the multifilament yarn, and thin-denier filaments are arranged in the peripheral portion. As a result, the intended characteristics of a spun-like yarn, such as a woolly or a cotton-like yarn, or a silky yarn are obtained.

When a spun-like yarn or a silky yarn is produced, it is indispensable that thin-denier filaments should surround thick-denier filaments so that good hand touch is generated by the thin-denier filaments. From this viewpoint, it is preferred that the number of constituent filaments in the filament group (I) be equal to or less than the number of constituent filaments in the filament group (II). Furthermore, it is preferred that the total denier De(I) of the filament group (I) and the total denier De(II) of the filament group (II) satisfy the requirement represented by the following formula:

$$0.25 \leq \frac{De(I)}{De(II)} \leq 4$$

When the total denier ratio is within the above-described range, an appropriate bulkiness can be manifested. Contrary to this, if the total denier ratio is outside the above-described range, no good balance is maintained between the filament groups (I) and (II), and accordingly, the bulkiness-manifesting force is reduced.

The polyester multifilament yarn of the present invention can be manufactured by melting independently a polyester composition (I) consisting essentially of at least one polyester selected from the group consisting of polyethylene terephthalate, polytrimethylene terephthalate and polytetramethylene terephthalate and a polyester composition (II) consisting essentially of a substrate composed of at least one polyester selected from the group consisting of polyethylene terephthalate, polytrimethylene terephthalate and polytetramethylene terephthalate and at least one additive polymer selected from the group consisting of styrene type polymers, methacrylate type polymers and acrylate type polymers, which is added to the substrate in an amount of 0.4 to 8% by weight based on the substrate; extruding the melts from different extrusion holes without mingling thereof; after cooling, doubling the extrudates without twisting and taking-up the resulting multifilament yarn.

Blending of polyesters or addition of the additive polymer to the substrate polyester may be accomplished by optional methods. For example, the blending or addition may be performed at the polymerization step, or there may be adopted a method in which the polymers are simultaneously molten and mixed, cooled and formed into chips. Furthermore, there may be adopted a method in which the polymers are mixed in the form of chips and the mixture is melt-spun. For the blending or addition, in order to enhance the degree of kneading, it is preferred that a screw type melt extruder be used.

In the present invention, the polymer compositions (I) and (II) may be extruded from different spinnerets, respectively. However, in order to enhance the blend property during a spinning step, it is preferred that the polymer compositions (I) and (II) be extruded from different extrusion holes of one single spinneret. In this case, it is preferred that the polymer composition (II) be extruded from extrusion holes arranged in the peripheral portion, and the polymer composition (I) be extruded from extrusion holes arranged in the central portion. The reasons are as follows. First, this arrangement of the extrusion holes contributes to the above-explained multifilament structure which is preferable for a spun-like yarn or a silky yarn and in which thin-denier filaments surround thick-denier filaments. Second, the polymer composition (II) which is scarcely oriented can be extruded from extrusion holes arranged in the peripheral portion, and therefore, the orientation of the polymer composition (II) is prevented. Third, because of this arrangement, polymer flow passages in a spinning pack does not become complicated.

In obtaining the polyester multifilament yarn of the present invention, it is preferrable that the spun multifilament yarn be taken up at a speed of at least 2000 m/min. When the spinning take-up speed is too low, no substantial orientation takes place in the filament group (II), and accordingly, the styrene type, methacrylate type or acrylate type polymer added therein fails to function sufficiently as "rolls" described above for preventing orientation of the molecular chain of the polyester. Accordingly, the effects of reducing the orientation and enhancing the elongation in the filament group (II) over the filament group (I) become insufficient.

In order to enhance the blending characteristic in the polyester multifilament yarn of the present invention, it is preferred that the polymer compositions (I) and (II) be extruded from different extrusion holes, cooled and then blended, and the resulting multifilament yarn be interlaced so that constituent filaments therein be intermingled with each other by means of a compressed air stream fed through an interlacing nozzle. When the interlaced multifilament yarn is continuously or discontinuously subjected to a drawing step or a draw texturing step, filaments belonging to the polymer composition (I) locates the central portion of the multifilament yarn forming a core portion, and filaments belonging to the polymer composition (II) wraps therearound forming a sheath portion, and accordingly, a splendid spun-like yarn can be produced as disclosed in U.S. patent application Ser. No. 6,219 filed on Jan. 14, 1979 now U.S. Pat. No. 4,307,565.

As will be apparent from the foregoing description, a polyester multifilament yarn having a high commercial value can be obtained in a very simple manner. Accordingly, the industrial significance of the present invention is very great.

The present invention will now be explained in detail with reference to the following Examples.

In the following Examples, please note that the intrinsic viscosities were determined at a temperature of 25° C. in O-chloro phenol solution having a concentration of 8% by weight.

EXAMPLES

Example 1

Polyethylene terephthalate having an intrinsic viscosity of 0.64 and containing 0.5% of titanium oxide as a delustering agent was used as the polymer composition (I), and a composition formed by blending said polyester with polymethyl methacrylate (which will be referred to as PMMA hereinafter) (Delpet 80N supplied by Asahi Kasei) at various blending ratios described in Table 1 in the form of chips was used as the polymer composition (II).

The respective compositions were molten, compressed and measured in a screw type melt extruder having a diameter of 25 mm and they were guided without mingling of flow passages of the respective melts. The melt of the composition (II) was extruded from 24 circular-shaped extrusion holes (0.2 mm in diameter) arranged in the peripheral portion of one spinneret to form a filament group (II). The melt of the composition (I) was extruded from 8 circular-shaped extrusion holes (0.3 mm in diameter) arranged in the inner portion of the same spinneret to form a filament group (I).

The extruded filaments of the groups (I) and (II) were cooled and solidified in a lateral-blow type spinning chimney disposed 110 cm below the spinneret by blowing air at room temperature at a speed of 12 m/min to the filaments. Then filaments were interlaced with each other by an air stream pressure of 1.5 Kg/cm$^2$, which was jetted from an interlacing nozzle mounted 4.5 m below the spinneret.

Finish was, then, applied to the filaments and the filaments were taken up through two godet rollers rotating at various speeds described in Table 1. The average breaking elongations of the filament groups (I) and (II) in the wound multifilament yarns are also described in Table 1.

TABLE 1

| Run No. | Spinning Speed (m/min) | Filament Group (I) | | Filament Group (II) | | | Remarks |
|---|---|---|---|---|---|---|---|
| | | de/fill | Breaking Elongation (%) | Blending Ratio (%) of PMMA | de/fil | Breaking Elongation (%) | |
| 1 | 1000 | 200/8 | 490 | 0 | 186/24 | 470 | comparison |
| 2 | 1000 | 200/8 | 490 | 2 | 186/24 | 600 | embodiment present invention |
| 3 | 2000 | 140/8 | 280 | 0 | 130/24 | 270 | comparison |
| 4 | 2000 | 140/8 | 280 | 1 | 130/24 | 360 | embodiment of the present invention |
| 5 | 2000 | 140/8 | 280 | 2 | 130/24 | 440 | embodiment of the present invention |
| 6 | 3000 | 72/8 | 170 | 0 | 68/24 | 140 | comparison |
| 7 | 3000 | 72/8 | 170 | 0.2 | 68/24 | 165 | comparison |
| 8 | 3000 | 72/8 | 170 | 0.6 | 68/24 | 260 | embodiment of the present invention |
| 9 | 3000 | 72/8 | 170 | 1 | 68/24 | 300 | embodiment of the present invention |
| 10 | 3000 | 72/8 | 170 | 2 | 68/24 | 365 | embodiment of the present invention |
| 11 | 3000 | 72/8 | 170 | 3 | 68/24 | 390 | embodiment of the present invention |
| 12 | 3000 | 72/8 | 170 | 5 | 68/24 | 450 | embodiment of the present invention |
| 13 | 3000 | 72/8 | 170 | 7 | 68/24 | 480 | embodiment of the present invention |
| 14 | 3000 | 72/8 | 170 | 9 | 68/24 | 270 | comparison |

In Runs Nos. 1, 3, 6 and 7, since PMMA was not blended or the blended amount of PMMA was too small, the breaking elongation of the filament group (II) was lower than the breaking elongation of the filament group (I). In Run No. 14, since the amount blended of PMMA was too large, the spinning condition was drastically degraded.

From the results of Runs Nos. 2, 4, 5 and 8 through 13 according to the present invention, it will readily be understood that if an appropriate amount of PMMA is blended, the breaking elongation of the filament group (II) can be higher than that of the filament group (I).

EXAMPLE 2

The multifilament yarns obtained in Runs Nos. 6 and 9 through 11 in Example 1 were false-twisted by means of an outer friction type false twisting device comprising three shafts, each of which is provided with three friction discs, at a processing draw ratio of 1.8, a processing speed of 300 m/min, a heater temperature of 170° C. and friction disc peripheral speed of 600 m/min. In case of the multifilament yarn obtained in Run No. 6, filaments of the group (II) gathered in the central portion to form a core and filaments of the group (I) were wrapped around the core. In contrast, in case of the multifilament yarns obtained in Runs Nos. 9 through 11, there were obtained yarns having a multi-layer structure comprising a core composed of the filament group (I) and a wrapper composed of the filament group (II).

Tubular knitted fabrics were produced by means of a circular knitted machine and by using the thus obtained processed yarns. In case of the multifilament yarn obtained in Run No. 6, the fabric showed a hard touch and a weak stiffness, but in case of the multifilament yarns obtained in Runs Nos. 9 through 11, the fabrics showed a soft touch and a good stiffness namely a good woolly hand.

EXAMPLE 3

A polymer composition (I) was prepared by blending 70% by weight of polyethylene terephthalate having an intrinsic viscosity of 0.64 and containing 0.5% of titanium oxide as a delustering agent with 30% by weight of polytetramethylene terephthalate having an intrinsic viscosity of 0.86 in the form of chips. Separately, a polymer composition (II) was prepared by blending polyethylene terephthalate having an intrinsic viscosity of 0.64 and containing 0.5% of titanium oxide with polystyrene (which will be referred to as PS hereinafter) (Styron 475D supplied by Asahi-Dow) at various blending ratios described in Table 2 in the form of chips.

The compositions were spun and taken up in the same manner as described in Example 1. The average breaking elongations of the filament groups (I) and (II) in the wound multifilament yarn are described in Table 2.

TABLE 2

| Run No. | Spinning Speed (m/min) | Filament Group (I) | | Filament Group (II) | | |
|---|---|---|---|---|---|---|
| | | de/fil | Breaking Elongation (%) | PS Blending Ratio (%) | de/fil | Breaking Elongation (%) |
| 1 | 2000 | 120/8 | 235 | 2 | 112/24 | 330 |
| 2 | 2000 | 120/8 | 235 | 4 | 112/24 | 405 |
| 3 | 2000 | 120/8 | 235 | 6 | 112/24 | 445 |
| 4 | 3800 | 60/8 | 79 | 2 | 56/24 | 136 |
| 5 | 3800 | 60/8 | 79 | 4 | 56/24 | 173 |
| 6 | 5000 | 45/8 | 48 | 1 | 42/24 | 93 |
| 7 | 5000 | 45/8 | 48 | 2 | 42/24 | 128 |

From the results described in Table 2, it is recognized that in each Run, the fine-denier filament group (II) had a higher breaking elongation than the thick-denier filament group (I).

EXAMPLE 4

Polytetramethylene terephthalate having an intrinsic viscosity of 0.86 and containing 0.5% of titanium oxide was used as the polymer composition (I). A composition obtained by blending said polyester with polyethyl acrylate (which will be referred to a PEA hereinafter) in an amount described in Table 3 in the form of chips was used as the polymer composition (II).

Both the compositions were spun and taken up in the manner as described in Example 1. The obtained results are described in Table 3.

TABLE 3

| Run No. | Spinning Speed (m/min) | Filament Group (I) | | Filament Group (II) | | | Remarks |
|---|---|---|---|---|---|---|---|
| | | de/fil | Breaking Elongation (%) | Blending Ratio (%) of PEA | de/fil | Breaking Elongation (%) | |
| 1 | 1000 | 150/8 | 280 | 0 | 140/24 | 240 | comparison |
| 2 | 1000 | 150/8 | 280 | 0.5 | 140/24 | 300 | embodiment of the present invention |
| 3 | 1000 | 150/8 | 280 | 1 | 140/24 | 370 | embodiment of the present invention |
| 4 | 1000 | 150/8 | 280 | 2 | 140/24 | 460 | embodiment of the present invention |
| 5 | 2000 | 72/8 | 180 | 0 | 68/24 | 140 | comparison |
| 6 | 2000 | 72/8 | 180 | 1 | 68/24 | 225 | embodiment of the present invention |
| 7 | 2000 | 72/8 | 180 | 2 | 68/24 | 293 | embodiment of the present invention |
| 8 | 3000 | 63/8 | 91 | 0 | 58/24 | 82 | comparison |
| 9 | 3000 | 63/8 | 91 | 1 | 58/24 | 138 | embodiment of the present invention |
| 10 | 3000 | 63/8 | 91 | 2 | 58/24 | 197 | embodiment of tthe present invention |

From the results described in Table 3, it is observed that in each of samples obtained in Runs Nos. 2 through 4, 6, 7, 9 and 10, the breaking elongation of fine-denier filaments of the group (II) was higher than that of thick-denier filaments of the group (I).

We claim:

1. A polyester multifilament yarn consisting essentially of: a filament group (I) comprised of at least one polyester selected from the group consisting of polyethylene terephthalate polytrimethylene terephthalate polytetramethylene terephthalate blends thereof and copolymers comprising at least two members selected from said polyesters; and a filament group (II) comprised of a polyester substrate selected from the group consisting of polyethylene terephthalate, polytrimethylene terephthalate, polytetramethylene terephthalate, blends thereof and copolymers comprising at least two members selected from said polyesters and from about 0.4 to 8% by weight based on the substrate of at least one polymer selected from the group consisting of styrenic polymers, methacrylate polymers and acrylate polymers added to said substrate wherein the average breaking elongation of filaments of the filament group (II) is larger than the average breaking elongation of filaments of the filament group (I) and wherein the average denier of constituent filaments of said filament group (I) is at least equal to the average denier of constituent filaments of said filament group (II).

2. A polyester multifilament yarn as set forth in claim 1, wherein the number of constituent filaments of said filament group (I) is at most equal to the number of constituent filaments of said filament group (II).

3. A polyester multifilament yarn as set forth in claim 1, wherein the total denier De(I) of said filament group (I) and the total denier De(II) of said filament group (II) satisfy the requirement represented by the following formula:

$$0.25 \leq \frac{De(I)}{De(II)} \leq 4$$

4. A polyester multifilament yarn of claim 1, wherein the filament group (I) and filament group (II) are cospun.

5. A polyester multifilament yarn of claim 1, wherein the yarn of the filament groups (I) and (II) is interlaced.

* * * * *